3,165,493
CHLORINATED LINEAR, MACROMOLECULAR ETHYLENE POLYMER COATING COMPOSITIONS, THEIR USE AND COATED PRODUCTS THEREOF
Gerald E. Clock, Midland, Herbert R. Bailey, Saginaw, and Stanley F. Roth, Midland, Mich., assignors to The Dow Chemical Company, Midland, Mich., a corporation of Delaware
No Drawing. Filed Nov. 13, 1959, Ser. No. 852,624
10 Claims. (Cl. 260—33.6)

The present invention contributes to the coating composition art and has particular reference to new and useful coating compositions that contain or are comprised of, as their essential resin constituent, certain varieties of chlorinated essentially linear and unbranched, marcromolecular ethylene polymers. The invention also pertains to the use of such compositions as well as to articles of manufacture resulting from application thereof to various accommodating substrates, especially such metal substrates as the tin plated steel sheet that is commonly used in the so-called "tin cans" and the like containers.

The chief aim and design of the present invention is to provide the indicated type of coating compositions in lacquer formulations which employ readily and economically available solvent vehicles for their preparation and which are characterized in having and displaying, amongst other advantageous and desirable attributes and features: (1) excellent adhesion to various substrate surfaces, particularly metal surfaces and especially tin plated steel; (2) excellent inherent heat stability, both before and during application and thereafter in the form of the resulting coating; (3) good film-forming properties and capabilities under the commonly encountered and otherwise conventional conditions used in the art for lacquer formulations; (4) the ability to easily form and readily furnish films and protective film coatings that are (a) strong, (b) tough, (c) clear, (d) chemically resistant and relatively inert and non-reactive, (e) possessed of good barrier properties against water and most aqueous liquids, water vapor and most gases and vapors, (f) possessed of good hot water resistance (a characteristic, as is readily apparent, of great importance as regards easy sterilizability), and (g) generally desirable and beneficial to employ.

It is also amongst the objectives of the invention to provide a method of using the presently contemplated lacquer compositions and to possibilitate and achieve the coated articles resulting therefrom.

These and other desiderations and cognate objects may be realized by practice of the present invention as hereinafter more fully described and delineated.

Accordingly, coating compositions are comprised of a lacquer formulation consisting of an aromatic hydrocarbon solvent vehicle (such as toluene) in which there is dispersed, as the essential resin constituent, chlorinated essentially linear and unbranched, macromolecular polyethylene from a parent linear ethylene polymer having a molecular weight in the range from ten or twenty thousand to sixty thousand and higher (up to as much as three million or more as may be determined from observation of such of its intrinsic properties as kinetic measurement of melt viscosity and the like), as is also evidenced by said parent polymer having a melt index (according to ASTM D-1238-52T) between about 15 and 75, advantageously from about 25 to 60; said chlorinated polyethylene containing at least about 60 weight percent of combined chlorine, based on the weight of the chlorinated polyethylene, advantageously between about 60 and 75 weight percent and, even more advantageously, in the neighborhood of 70 weight percent of combined chlorine.

Most advantageously, the lacquer compositions of the present invention are comprised of and prepared from "block" chlorinated macromolecular polyethylene (as hereinafter more fully delineated). The "block"-type variety of chlorinated macromolecular polyethylene of which the present lacquer compositions are advantageously comprised is derived or obtained by chlorinating a parent macromolecular polyethylene polymer of the described variety which has an essentially linear and unbranched molecular structure.

The macromolecular, essentially linear polyethylene from which the presently employed chlorinated derivatives are derived may advantageously be prepared according to various recently proposed techniques. For example, according to a process first proposed by Professor Karl Ziegler and his associates in Germany, ethylene may be polymerized into an essentially linear and unbranched molecular structure which may advantgeously have such greater molecular weights and corresponding melt viscosities under relatively low pressures ranging from 1 to 100 atmospheres with catalyst mixtures of strong reducing agents and compounds of Group IV–B, V–B and VI–B metals of the Mendeléeff Periodic System. Aluminum alkyls admixed with salts of titanium or zironium are utilized with particular benefit in this process.

Other known processes for producing polyethylene having characteristics of the essentially linear and macromolecular polymer products may employ such materials for catalysts as chromium oxide on silicated alumina; hexavalent molybdenum compounds; and charcoal-supported nickel-cobalt. Belgian Patent No. 533,362; Canadian Patents Nos. 502,597 and 525,884; and U.S. Patents Nos. 2,586,322 and 2,816,883 disclose typical varieties of macromolecular linear polyethylene which have recently become available to the art and which are readily distinguishable from the conventional varieties of branch structured type polyethylenes which are sometimes referred to as "polythenes." The older "polythene"-type polyethylenes, as is well known, are commonly and frequently prepared by polymerizing monomeric ethylene in the presence of polymerization-favoring quantities of oxygen and water, having a pH greater than 7, under a pressure of at least 500 and, advantageously, 1,000 atmospheres and at temperatures of from 150° C. to 275° C. Polyethylene products prepared in this manner generally have substantially branched or side chain-containing molecular structures and seldom attain a molecular weight in excess of about 40,000. They usually melt at about 110° C. and have densities in the general range of 0.92 or so grams per cubic centimeter.

The above-mentioned macromolecular polyethylenes, as apparent, ordinarily have significantly greater molecular weights (or at least greater melt viscosities) than the typical "polythene" polymers. In addition, macromolecular polyethylene generally has a greater density than the "polythene" product. The density of macromolecular, essentially linear polyethylene is usually in the neighborhood of at least 0.94 to 0.96 gram per cubic centimeter. It is also more resistant to the softening effects of heat and, in general, has higher softening, melting and heat distortion temperatures than does the "polythene" polymer. The melting point of macromolecular polyethylene, for example, is usually in the neighborhood of 125–135° C., particularly in materials having apparent molecular weights in excess of about 10,000. It is, as mentioned, essentially an unbranched, linear polymer and may be made to contain less than 3 and even less than 0.03 methyl groups per 100 methylene groups in the polymer molecule. It is found to be more crystalline in nature than polyethylene prepared by the previously employed, "polythene"-manufacturing, higher pressure methods. The macromolecular polyethylene from which the chlorinated product used in the present records is derived is, for convenience, sometimes referred to as an "ultrathene" to distinguish it from the ordinarily lower apparent molecular weight, less dense and crystalline and substantially more branched "polythene" polyethylenes prepared according to earlier known techniques.

The "block"-type chlorinated macromolecular polyethylene product advantageously utilized for preparation of the improved lacquer compositions of the present invention may advantageously be obtained in a form wherein the distribution of combined chlorine is such that at least as many as four adjacent, unsubstituted methylene groups may be found at any point in or along the chain of the halogenated polymer molecule. This variety of arrangement may be schematically represented, as it is thought to occur on the basis of infra-red and other analyses, in the following manner:

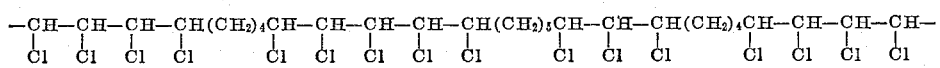

Halogenated products having such an intermittent or "block"-like, non-statistical distribution of chlorine in the polymer molecule so that frequently, as indicated, at least as many as four adjacent methylene groups may be found at any point in the polymer molecule can be prepared in various ways. For example, as disclosed in the copending application of Fred D. Hoerger and Elton K. Morris, Serial No. 543,626, filed October 28, 1955, now abandoned a dry "ultrathene" can be directly chlorinated to provide a "block"-type halogenated product by subjecting an agitated, free-flowing powder mass of the polymer to an atmosphere of chlorine at a temperature beneath the sintering point of the macromolecular polyethylene. Or, as disclosed in the copending application Serial No. 543,628, also filed on October 28, 1955 now abandoned by Hoerger and Morris, an "ultrathene" can advantageously be chlorinated to a "block" halogenated product by passing chlorine through an agitated slurry formed by suspending the finely divided macromolecular polyethylene in water or other inert, non-solvent liquid and employing, if desired, a free-radical generating catalyst to accelerate the halogenation reaction.

As mentioned, the solvent vehicles employed in the present lacquer formulations include such aromatic hydrocarbons as toluene, xylene, benzene and the like or equivalent liquids, particularly aromatic hydrocarbons containing from 6 to about 10 carbon atoms in their molecular configuration, including the carbon atoms in the hydrocarbon substituents on the aromatic ring.

Due to its excellent solvent power on the chlorinated macromolecular polyethylene resin and for reasons of economy, it is generally advantageous to employ toluene as the solvent in the formulation. The resin constituent in the present lacquer compositions is generally insoluble in the conventional ketone-type solvents that are commonly utilized for the preparation of other conventional lacquers. Despite this, the aromatic hydrocarbon solvent vehicle used for formulation of the present compositions may, in certain instances, be advantageously diluted with up to 50 weight percent of a ketone solvent, such as methyl ethyl ketone or methyl isobutyl ketone, in order to secure specific flow characteristics in the resulting lacquer formulation. Thus, minor proportions of the aromatic hydrocarbon solvent vehicle may be comprised of a solvent constituent that does not actually, in and of itself, efficiently dissolve the chlorinated macromolecular polyethylene resin.

The solids content of the lacquer compositions of the present invention may vary from about 5 to about 50 weight percent, based on total weight of the composition, although for most purposes it is advantageous for the quantity of dissolved resin in the lacquer to be between about 10 and about 30 weight percent, based on total composition weight.

If desired, the lacquer compositions of the present invention can be pigmented or colored in the usual manner using any of the materials conventionally employed for such purpose such as titania, carbon black, zinc chromate, red lead and any of the so-called inhibitive pigment additaments.

Minor proportions of certain plasticizing ingredients may also be incorporated in the present lacquer compositions in order, if desired or necessary, to improve the elasticity of the film coating resulting from application of the lacquer. The particular plasticizing material employed should be one, as is apparent, that is compatible in the lacquer system and has an efficient plasticizing effect on the chlorinated macromolecular polyethylene resin employed therein. Typical of such a plasticizer is tributoxy ethyl phosphate.

The lacquer formulations of the present invention may be employed for coating many of a wide variety of substrates and are generally found to have good adherence to and on such diverse materials as various paper products (i.e., glassine, milk carton stock and the like); tin plate; bonderized steel; carbon steel; various other metal substrates including aluminum, magnesium and the like; polyethylene and other plastic films and articles; and over many of the frequently employed commercial maintenance primers such as wash primer, vinyl primer and chlorinated rubber primer.

Thus, as is apparent, the lacquer compositions of the present invention may advantageously be employed in a conventional manner as paints and protective coating compositions as well as for can linings and in similar applications. In this connection, it is generally advantageous for the coating thickness to be effected from application of the lacquer compositions to be between about 0.05 and 10 mils, depending upon the particular application of the lacquer being made and the substrate being coated. Thus, coatings for can linings are generally in the range of thickness between about 0.1 and 0.5 mil, frequently in the neighborhood of 0.2 mil. Coatings intended to function as paints or as general protective covers ordinarily have thicknesses between about 0.5 mil and 5–6 mils.

The lacquer compositions of the present invention may be coated on any desired substrate surface by various spread, dip, brush, spray or other casting techniques best suited in individual cases to meet the needs of a particular situation involved. After application, the compositions may be dried according to usual and conventional techniques to effect a solid deposition of the tightly adhered resin layer from the lacquer. The particular drying conditions that are required insofar as whether room temperatures or heat at elevated temperatures is necessary to best dry the applied composition depends, as will be apparent to those skilled in the art, to a great extent upon the particular application being made and the drying requriements involved in particular instances. Ordinarily, better results are obtained when the applied coating composition is permitted to air dry followed by baking at an elevated temperature as between about 200 and 400° F. for a period of time between about 1 and 10 or more minutes, advantageously for about 5 minutes at 250–300° F.

The coating compositions of the present invention have very good resistance to hot water and excellent adherent stability against discoloration, particularly that which might be occasioned by contact of the composition with iron. This, as is apparent, is of significant and material advantage insofar as general attractiveness and applicability of the formulations are concerned.

In order to further exemplify the invention, but without being restricted thereto, the following docent illustrations are given wherein, unless otherwise indicated, all parts and percentages are to be taken by weight.

ILLUSTRATION "A"

A series of chloriated macromolecular polyethylene compositions having combined chlorine contents in the neighborhood of 69.1 to 70.3 percent by weight which were derived through aqueous suspension chlorination of parent linear, macromolecular polyethylenes having apparent molecular weights of from 20 to 29 thousand were formulated into lacquers (using toluene as a solvent) and applied to tin plate in order to obtain protective coatings. Each of the lacquers had a dissolved solids content of about 20 percent. The applied coatings were dried for five minutes at 350° F. They had excellent adhesion to the tin plate and did not discolor or become degraded during the drying, as is frequently experienced with various commercial resins. The dried coatings had excellent heat stability upon being tested for seven days as 212° C. in an oven; unusually good hot water resistance (showing no evidence of blushing or loss of adhesion when immersed in distilled water for 20 minutes at 175° F.); were strong and tough, did not become discolored upon exposure to ultraviolet light; and had good water barrier properties.

The stability of the prepared chlorinated macromolecular polyethylene (MCPE) lacquers was good. The dissolved resins showed no signs of gelation upon standing for more than 4 weeks. The lacquers also exhibited excellent adhesion to glass.

In comparison, equivalent satisfactory lacquer coating compositions cannot be made with chlorinated macromolecular polyethylene compositions containing less than about 60 percent of combined chlorine due to solubility and gelation problems. The highly chlorinated macromolecular polyethylene compositions are also, as has been indicated in the foregoing, insoluble in the solvents that are commonly employed for the usual vinyl lacquers, including methyl ethyl ketone, methyl isobutyl ketone, acetone and the like solvents in the ketone series.

ILLUSTRATION "B"

The water vapor transmission rates of several different films, including one prepared with a highly chlorinated macromolecular polyethylene composition, were determined in a General Foods Humidity Cabinet following the usual standard test procedure at 98–100° F. and 95 percent relative humidity. The results are set forth in the following tabulation. The chlorinated macromolecular polyethylene (CMPE) had a combined chlorine content of about 70 percent. It had been derived from a parent polymer having an apparent molecular weight of about 29 thousand using an aqueous suspension technique for the chlorination. The polyethylene (PE) film was a conventional branch structured "polythene"-type of polymer. The VCl/VeCl$_2$ copolymer was a copolymer of vinyl chloride and vinylidene chloride that contained about 85 percent of the former in the polymer molecule. The saran resin was a copolymer of vinylidene chloride and acrylonitrile containing about 80 percent of vinylidene chloride in the polymer molecule. The VCl/VAc resin was a copolymer of vinyl chloride and vinyl acetate that contained about 87 percent of polymerized vinyl chloride. The thickness of each film tested was about 20 mils.

*Table I.—Water Vapor Transmission Rate of CMPE in Comparison With Other Resins*

| Film | Water Vapor Transmission Rate in Grams/24 hours/100 Sq. Inches |
|---|---|
| CMPE | 0.60 |
| PE | 0.97 |
| VCl/VeCl$_2$ | 0.72 |
| Saran Resin | 0.15 |
| VCl/VAc | 2.00 |

As is evident in the foregoing, the water vapor transmission rate of the chlorinated macromolecular polyethylene film was very low, falling intermediate between the vinyl films and the saran film. As is well known, the vapor barrier properties of saran films are generally considered to be outstanding. As is also apparent from the foregoing, film coatings prepared from the present compositions have adequate and entirely satisfactory water vapor barrier properties.

ILLUSTRATION "C"

In order to demonstrate the superiority of the lacquer compositions of the present invention to lacquer compositions analogously prepared from chlorinated, conventional, "polythene"-type polyethylene, a series of lacquer formulations were prepared using both chlorinated macromolecular polyethylene resin in accordance with the present invention and a chlorinated "polythene"-type polyethylene resin of the variety first known to the art.

The lacquer formulations prepared in accordance with the present invention were formulated using a chlorinated macromolecular polyethylene resin containing 70 percent combined chlorine derived from a parent polymer having a melt index of 39.8. The chlorinated "polythene"-type polyethylene resins were prepared from conventional, branch-structured low density polyethylene obtained by high pressure polymerization of ethylene ("Alathon G") containing 69.2 percent combined chlorine. Both of the chlorinated resins were prepared by a wet suspension chlorination process of the type mentioned in the first illustration.

Both of the lacquer formulations were applied to tin plate and tested for adhesion, flexibility, resistance to heat degradation and hot water and loss of adhesion after immersion in hot water. Each of the lacquer compositions was applied by dip application to the tin plate from 20 percent solutions of the resins in toluene in order to secure applied film coatings having average thicknesses of about 0.2 mil. Each of the coated samples were air dried, followed by baking at temperatures from 200° F. to 400° F. for 5 minutes. The adhesion of the applied coating was determined by cross-hatching with a razor blade and attempting to strip the marred film with adhesive cellophane tape. Flexibility was determined by bending the coated panel over a ⅛ inch mandrel. The water immersion test was carried out by immersing the coated panels in distilled water for 30 minutes. The results obtained are included in the following tabulation:

Table II

COMPARISON OF LACQUER COATINGS FROM CHLORINATED MACROMOLECULAR POLYETHYLENE (CMPE) AND CHLORINATED "POLYTHENE"-TYPE POLYETHYLENE

| Resin In Lacquer Composition | Adhesion, percent | Flexibility | Discoloration | Blushing | Adhesion |
|---|---|---|---|---|---|
| 200° F. 5 MIN. BAKE (WATER IMMERSION) | | | | | |
| Chlorinated "Polythene" | 0 | Cracked [1] | 0 | Moderate | 0 |
| CMPE | 0 | Silvered [2] | 0 | None | 0 |
| 250° F. 5 MIN. BAKE | | | | | |
| Chlorinated "Polythene" | 0 | Cracked | 0 | Moderate | 0 |
| CMPE | 70 | Silvered | 0 | None | 0 |
| 350° F. 5 MIN. BAKE | | | | | |
| Chlorinated "Polythene" | 0 | Cracked | Slight | Moderate | 0 |
| CMPE | 100 | Silvered | 0 | None | 50 |
| 375° F. 5 MIN. BAKE | | | | | |
| Chlorinated "Polythene" | 0 | Cracked | Moderate | Moderate | 0 |
| CMPE | 100 | Silvered | Very Slight | None | 100 |

[1] Indicates gelling of the coating, brittleness and loss of adhesion on physical test.
[2] Indicates ability of coating to stay solid and develop no more than fine hairline cracks visible only under the microscope as a result of physical test.

Those who are skilled in the art will readily appreciate that all the foregoing is merely illustrative of certain of the possible embodiments of the present invention which is capable of being successfully and satisfactorily practiced within the scope of the hereto appended claims while entering into many changes and modifications that do not substantially depart from the spirit and purview of the invention.

What is claimed is:

1. Coating composition consisting essentially of (a) between about 5 and about 50 weight percent, based on the weight of the composition, of a chlorinated macromolecular polyethylene resin having an essentially linear and unbranched molecular structure from a parent macromolecular polyethylene having a melt index between about 15 and 75 and containing at least about 60 weight percent of combined chlorine and (b) between about 95 and about 50 weight percent, based on the weight of the composition, of a solvent vehicle comprised of at least about 50 weight percent of an aromatic hydrocarbon solvent for said chlorinated macromolecular polyethylene, said aromatic hydrocarbon containing between about 6 and about 10 carbon atoms in its molecular structure, any balance of said solvent vehicle being another organic ketone solvent for vinyl lacquers that is miscible with said aromatic hydrocarbon solvent; said chlorinated macromolecular polyethylene being the sole film-making resin in the composition.

2. The composition of claim 1, wherein said chlorinated macromolecular polyethylene resin contains about 70 weight percent of combined chlorine.

3. The composition of claim 1 containing between about 10 and about 30 weight percent of said chlorinated macromolecular polyethylene resin.

4. The composition of claim 1, wherein the combined chlorine in said chlorinated macromolecular polyethylene resin is substantially intermittently distributed in block-like grouping concentrations along the polymer chain characterized in being separated by adjacent interconnected methylene groups in the molecule of the halogenated polyethylene.

5. The composition of claim 1, wherein said solvent vehicle consists entirely of said aromatic hydrocarbon solvent.

6. The composition of claim 1, wherein said solvent vehicle is toluene.

7. As an article of manufacture, a solid at room temperature substrate having as a protective coating thereon an applied layer consisting essentially of a thickness between about 0.05 mil and about 10 mils of a chlorinated macromolecular polyethylene resin having an essentially linear and unbranched molecular structure from a parent marcromolecular polyethylene having a melt index between about 15 and 75 and containing at least about 60 weight percent of combined chlorine; said chlorinated macromolecular polyethylene being the sole film-making resin in the coating.

8. The article of claim 7, wherein said substrate is tin plate.

9. The article of claim 7, wherein said substrate is carbon steel.

10. The article of claim 7, fabricated in the form of a container for liquids wherein said applied coating deposit has a thickness of between about 0.1 and 0.5 mil.

References Cited in the file of this patent

UNITED STATES PATENTS

| 2,618,574 | Pavlic | Nov. 18, 1952 |
| 2,779,754 | Erchak | Jan. 29, 1957 |
| 2,930,726 | Jones et al. | Mar. 29, 1960 |
| 2,959,562 | Klug | Nov. 8, 1960 |